UNITED STATES PATENT OFFICE.

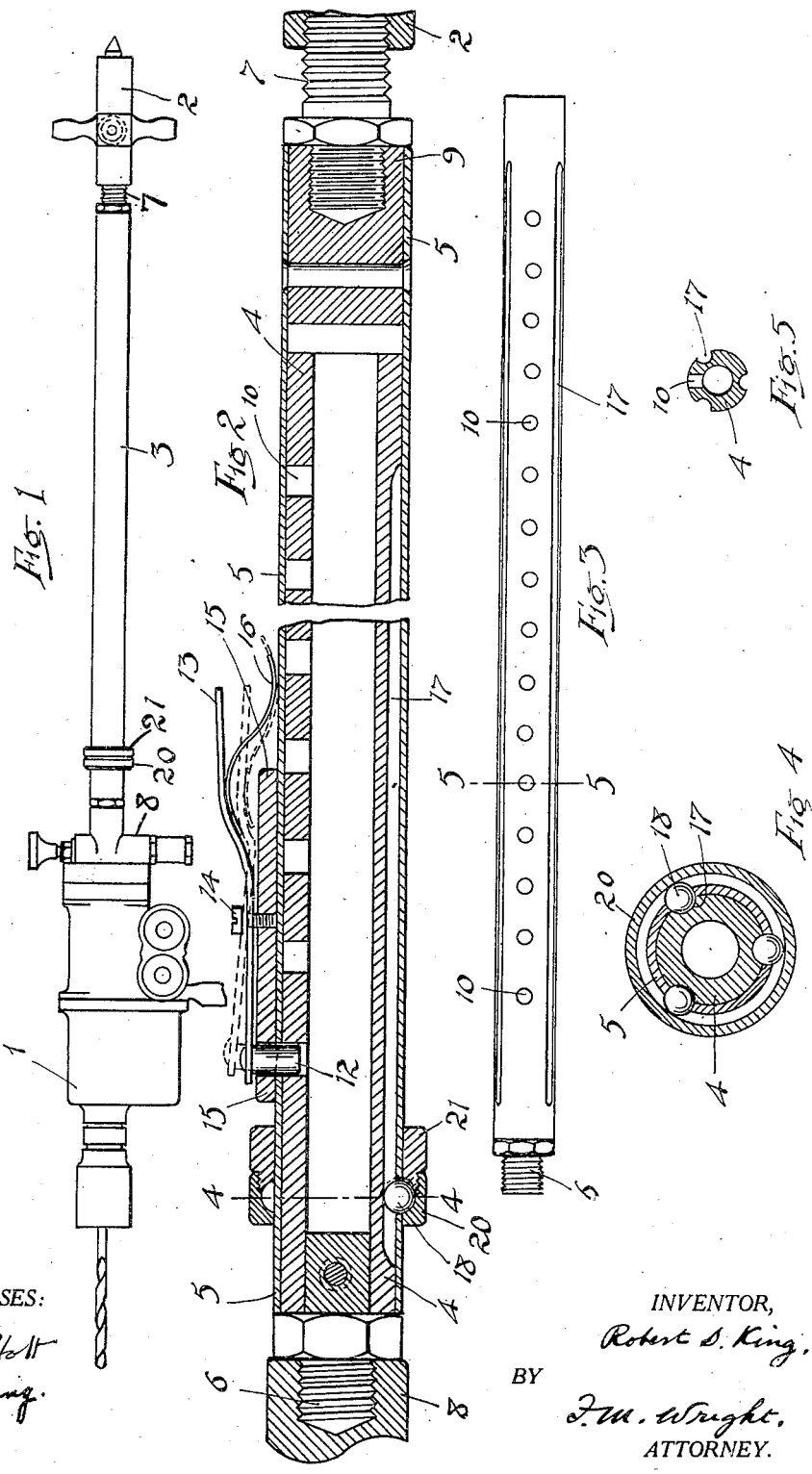

ROBERT S. KING, OF VALLEJO, CALIFORNIA.

EXTENSIBLE SHAFT-COUPLING.

No. 918,062.

Specification of Letters Patent. Patented April 13, 1909.

Application filed July 22, 1907. Serial No. 385,077.

*To all whom it may concern:*

Be it known that I, ROBERT S. KING, a citizen of the United States, residing at Vallejo, in the county of Solano and State of California, have invented new and useful Improvements in Extensible Shaft-Couplings, of which the following is a specification.

The object of the present invention is to provide an extensible shaft coupling adapted for various uses, and particularly for a feed for a pneumatic drill, by means of which the drill can be adjusted to a greater range of work than heretofore.

In the accompanying drawing, Figure 1 is a side view of a pneumatic drill having my extensible feed applied thereto; Fig. 2 is a broken longitudinal section on an enlarged scale of the extension and portions of the drill and feeder attached thereto; Fig. 3 is a top plan view of the inner tube detached; Fig. 4 is cross section on the line 4—4 of Fig. 2; Fig. 5 is a cross section on the line 5—5 of Fig. 3.

Referring to the drawing, 1 indicates a pneumatic drill of common construction, and 2 the usual feeder for said drills. 3 indicates an extension which, as clearly shown in Fig. 2, comprises an inner tube 4, and an outer tube 5 slidable upon the inner tube. The inner tube 4 has at one end a threaded plug 6 precisely similar to the plug 7 of the feeder 2 and adapted in place of said plug to be screwed into the socket 8 of the pneumatic drill, and the outer member 5 has at the other end a socket 9 precisely similar to the socket 8, and adapted to receive the threaded plug 7 of the feeder 2. Said outer member 5 can be moved longitudinally upon the inner member 4, and, to secure it in any one of a series of positions thereon, there are formed in the inner member a longitudinal series of holes 10, and adapted to engage any one of these holes is a stop pin 12 carried on the end of a lever 13 pivoted on a screw post 14, screwed into a plate 15 secured upon the outer member, the other end of said lever being adapted to be pressed outward by a spring 16. Thereby said stop pin is retained in whichever of the holes 10 it enters until released by depressing the other end of said lever.

In order to insure that the stop pin will travel in the line of holes 10, the inner member is formed with longitudinal grooves 17 into which extend balls 18 contained in a circular channel 19 formed by inner and outer collar sections 20, 21, screwed together, as more clearly shown in Figs. 2 and 4. This permits the outer tube to move freely upon the inner tube longitudinally, but without turning thereon.

Because the grooves 17 are closed at the ends, and the balls are contained in apertures in the tube 5, said balls form locking keys preventing the withdrawal of the tube 5 from the tube 4. Moreover, the collar sections 20, 21, can be rotated freely upon the tube 5, and thereby each ball can be caused to rotate upon an axis parallel with the extension. This prevents the ball running always on the same part and prevents undue wear upon any one part, so that the ball wears uniformly.

It is obvious that this device enables a pneumatic drill to be used for a much greater range of work than with devices of this class heretofore employed, while at the same time it is readily and quickly adjustable to permit the drill to be placed at the best advantage for the work to be done.

I claim:—

1. An extension device comprising two members telescoping one on the other, the inner member being formed with longitudinal grooves, balls in the respective grooves, the outer member being apertured to receive the respective balls, and a loose collar on the outer member having a circular channel for the outer portions of all the balls, substantially as described.

2. An extension device comprising two members telescoping one on the other, the inner member being formed with longitudinal grooves, balls in the respective grooves, the outer member being apertured to receive the respective balls, and inner and outer collar sections screwed together, each formed with a circular recess, which when the sections are screwed together, form a circular channel for the balls, substantially as described.

In testimony whereof I have hereunto set my hand in the presence of two subscribing witnesses.

ROBERT S. KING.

Witnesses:
J. H. HERBERT,
W. L. KING.